United States Patent
Dorfi et al.

(10) Patent No.: US 11,959,827 B2
(45) Date of Patent: Apr. 16, 2024

(54) ESTIMATING TREAD DEPTH REMAINING ON VEHICLE-MOUNTED TIRE BY ESTIMATING THERMAL MASS OF TIRE BASED ON DETECTED CHANGES IN DETECTED OPERATIONAL DATA AND TIRE CONDITION DATA OVER TIME

(71) Applicant: BRIDGESTONE AMERICAS TIRE OPERATIONS, LLC, Nashville, TN (US)

(72) Inventors: Hans R. Dorfi, Akron, OH (US); Thomas A. Sams, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/275,059

(22) PCT Filed: Oct. 7, 2021

(86) PCT No.: PCT/US2021/053870
§ 371 (c)(1),
(2) Date: Jul. 31, 2023

(87) PCT Pub. No.: WO2022/191875
PCT Pub. Date: Sep. 15, 2022

(65) Prior Publication Data
US 2024/0035928 A1 Feb. 1, 2024

Related U.S. Application Data

(60) Provisional application No. 63/160,059, filed on Mar. 12, 2021.

(51) Int. Cl.
*G01M 17/02* (2006.01)
*B60C 11/24* (2006.01)
(Continued)

(52) U.S. Cl.
CPC .......... *G01M 17/02* (2013.01); *B60C 11/246* (2013.01); *B60C 23/20* (2013.01); *G01L 17/00* (2013.01);
(Continued)

(58) Field of Classification Search
None
See application file for complete search history.

(56) References Cited

U.S. PATENT DOCUMENTS 6,151,959 A 11/2000 Cantu
6,327,904 B1 12/2001 Oldenettel
(Continued)

FOREIGN PATENT DOCUMENTS

CN 108688414 A 10/2018
DE 10058099 A1 5/2002
(Continued)

OTHER PUBLICATIONS

International Search Report, corresponding application No. PCT/US2021/053870, dated Jan. 26, 2022, 5 pages.

*Primary Examiner* — Freddie Kirkland, III (57) ABSTRACT

Systems and methods are disclosed herein for estimating tread depth remaining on a tire mounted on a vehicle. One or more sensors are provided for detecting operational data associated with the vehicle and tire measurements corresponding to ambient temperature and contained air temperature, which may be directly measured or derived from measured tire pressure. A thermal mass of the tire is estimated based on at least the detected operational data and tire conditions, and a current tread depth of the tire is estimated based at least in part on the respective estimated thermal mass. In certain embodiments, the thermal mass estimation may be performed using heat transfer models limited to measurements captured during a cooling down phase of the (Continued)

tire while the vehicle is not moving, thereby simplifying calculation of a corresponding time constant.

20 Claims, 6 Drawing Sheets

(51) Int. Cl.
  *B60C 23/20* (2006.01)
  *G01L 17/00* (2006.01)
  *G01L 19/00* (2006.01)
  *B60C 19/00* (2006.01)

(52) U.S. Cl.
  CPC .... *G01L 19/0092* (2013.01); *B60C 2019/004* (2013.01)

(56) References Cited

U.S. PATENT DOCUMENTS

| | | | |
|---|---|---|---|
| 6,741,169 B2 * | 5/2004 | Magiawala | B60C 23/0494 |
| | | | 340/447 |
| 7,158,018 B2 | 1/2007 | Schick | |
| 7,320,246 B2 | 1/2008 | Schick et al. | |
| 8,849,500 B2 | 9/2014 | Gokyu et al. | |
| 9,428,013 B2 | 8/2016 | Singh | |
| 9,636,955 B2 | 5/2017 | Singh et al. | |
| 10,507,697 B2 * | 12/2019 | Spinnler | B60C 23/20 |
| 10,603,962 B2 * | 3/2020 | Singh | B60C 23/0408 |
| 10,730,352 B2 * | 8/2020 | Makke | G01N 3/56 |
| 10,830,908 B2 * | 11/2020 | Siegel | G01M 1/225 |
| 10,960,712 B2 * | 3/2021 | Storti | B60W 40/12 |
| 11,167,604 B2 | 11/2021 | Delacroix | |
| 11,458,776 B2 * | 10/2022 | Ciaravola | G01M 17/02 |
| 11,458,784 B2 * | 10/2022 | Tang | G01P 15/18 |
| 2015/0057877 A1 | 2/2015 | Singh | |
| 2015/0239298 A1 | 8/2015 | Kretschmann | |
| 2015/0360525 A1 | 12/2015 | Singh et al. | |
| 2017/0113494 A1 * | 4/2017 | Singh | B60C 23/0486 |
| 2017/0129498 A1 * | 5/2017 | Singh | B60C 23/00 |
| 2018/0272813 A1 | 9/2018 | Singh | |
| 2019/0315165 A1 | 10/2019 | Delacroix | |
| 2021/0061022 A1 | 3/2021 | Singh et al. | |
| 2023/0256778 A1 * | 8/2023 | Wei | B60C 11/246 |
| | | | 701/29.4 |

FOREIGN PATENT DOCUMENTS

| | | | | |
|---|---|---|---|---|
| EP | 1499508 A1 | 1/2005 | | |
| EP | 1499508 B1 | 2/2007 | | |
| EP | 4101659 A1 * | 12/2022 | | B60C 11/246 |
| JP | 2005047295 A | 2/2005 | | |
| KR | 1020190105505 A | 9/2019 | | |
| WO | 2017187164 A1 | 11/2017 | | |

* cited by examiner

ESTIMATING TREAD DEPTH REMAINING ON VEHICLE-MOUNTED TIRE BY ESTIMATING THERMAL MASS OF TIRE BASED ON DETECTED CHANGES IN DETECTED OPERATIONAL DATA AND TIRE CONDITION DATA OVER TIME

FIELD OF THE DISCLOSURE

The present disclosure relates generally to tread depth estimation for tires on wheeled vehicles.

More particularly, systems, methods, and related algorithms as disclosed herein may use tire pressure and/or ambient temperature measurements for, e.g., improved estimation of tread depth for tires of wheeled vehicles including but not limited to motorcycles, consumer vehicles (e.g., passenger and light truck), commercial and off-road (OTR) vehicles.

BACKGROUND

Estimation of current tire tread depth and associated predictions of tire wear are important tools for anyone owning or operating vehicles, particularly in the context of fleet management. As tires are used, it is normal for the tread to gradually become shallower and overall tire performance to change. At a certain point it becomes critical to be aware of the tire conditions, as insufficient tire tread can create unsafe driving conditions. For example, when road conditions are non-optimal the tires may be unable to grip the road and a driver may lose control of his or her vehicle. Generally stated, the shallower the tire tread, the more easily the driver may lose traction when driving in rain, snow, or the like.

In addition, irregular tread wear may occur for a variety of reasons that may lead users to replace a tire sooner than would otherwise have been necessary. Vehicles, drivers, and individual tires are all different from each other, and can cause tires to wear at very different rates. For instance, high performance tires for sports cars wear more quickly than touring tires for a family sedan. However, a wide variety of factors can cause a tire to wear out sooner than expected, and/or cause it to wear irregularly and create noise or vibration. Two common causes of premature and/or irregular tire wear are improper inflation pressure and out-of-spec alignment conditions.

It would be desirable to provide tread depth estimation, preferably in something approaching real-time, the lack of which otherwise creates difficulties for a number of important fleet management tasks, such as for example the generation of maintenance alerts, predicting the amount of wear life remaining, forecasting which (and when) tires will need to be replaced, cost projections, etc.

It would further be desirable if such tread depth estimations could be provided without any additional hardware needing to be added to a vehicle.

BRIEF SUMMARY

Exemplary systems, methods, and associated models are disclosed herein for estimating the tread depth of a tire. In various embodiments, such models may be theoretically founded in that the thermal time constant is directly related to the mass of the tire, so that as the tire wears and loses mass, the thermal time constant will decrease. In particular embodiments, such models may focus on periods of time when the tire is at a standstill and is cooling down, which simplifies the relationship between thermal time constant and tire mass.

An exemplary embodiment of a computer-implemented method as disclosed herein for estimating tread depth remaining on at least a first tire mounted on a vehicle may comprise detecting operational data associated with the vehicle and/or the tire, and further detecting tire condition data corresponding to at least an ambient temperature and a contained air temperature. A thermal mass of the tire may be estimated based at least in part on detected changes in the detected operational data and the tire condition data over time. A current tread depth of the tire may further be estimated based at least in part on the respective estimated thermal mass.

In one exemplary aspect in accordance with the above-referenced embodiment, the contained air temperature may be measured directly via a tire-mounted sensor. Alternatively, the contained air temperature may be derived in association with a directly measured tire inflation pressure.

In another exemplary aspect in accordance with the above-referenced embodiment, the tire condition data may be detected via one or more sensors mounted to an exterior of the at least first tire.

In another exemplary aspect in accordance with the above-referenced embodiment, the method may further include, with the vehicle stopped, determining changes over time in a time constant associated with the tire during a cooling period, and estimating a change in thermal mass of the tire based at least in part on the determined changes over time in the time constant.

In another exemplary aspect in accordance with the above-referenced embodiment, the method may further include, with the vehicle stopped, monitoring the tire pressure and/or the contained air temperature during a cooling period, determining a cooling rate of the monitored tire pressure and/or contained air temperature during the cooling period, and estimating the thermal mass of the tire based at least in part on the determined cooling rate of the monitored tire pressure and/or contained air temperature.

In another exemplary aspect in accordance with the above-referenced embodiment, with the vehicle in movement the detected operational data associated with the vehicle further comprises a vehicle speed and a load, and the method further comprises determining a time constant dependent with respect to the thermal mass of the tire.

In another exemplary aspect in accordance with the above-referenced embodiment, with the vehicle in movement the detected operational data associated with the vehicle further comprises a vehicle speed, and the estimated thermal mass of the tire is calibrated based on aggregated models of thermal mass with respect to historical data for tire pressure and/or contained air temperature.

In another exemplary aspect in accordance with the above-referenced embodiment, the method may further include implementing the estimated tread depth as an input to a tire wear prediction model.

In another exemplary aspect in accordance with the above-referenced embodiment, the method may further include predicting a replacement time for the at least first tire, based on a predicted tire wear status, as compared with one or more tire wear thresholds associated with the tire.

In another exemplary aspect in accordance with the above-referenced embodiment, the one or more tire wear thresholds may comprise a tire tread threshold corresponding to a given wheel position for the vehicle-tire combination.

In another exemplary aspect in accordance with the above-referenced embodiment, the method may further include generating a vehicle maintenance alert comprising the predicted replacement time and an identifier associated with the vehicle-tire combination, and transmitting a message comprising the vehicle maintenance alert to a fleet management device.

In another embodiment, a system is disclosed herein for estimating tread depth remaining on at least a first tire mounted on a vehicle, comprising one or more sensors and a computing device functionally linked to the one or more sensors and to a selectable algorithmic thermal model, and configured to direct the performance of steps in a method according to the above-referenced embodiment and optionally any one or more of the associated exemplary aspects.

In one exemplary aspect according to the above-referenced system embodiment, the one or more sensors are mounted to an exterior of the at least first tire.

In another exemplary aspect according to the above-referenced system embodiment, the one or more sensors comprise a tire pressure monitoring system (TPMS) sensor.

In another exemplary aspect according to the above-referenced system embodiment, the computing device is remote with respect to the vehicle and functionally linked to the one or more sensors via a communications network and at least a second computing device residing within the vehicle.

BRIEF DESCRIPTION OF THE SEVERAL VIEWS OF THE DRAWINGS

Hereinafter, embodiments of the invention are illustrated in more detail with reference to the drawings.

DETAILED DESCRIPTION

Referring generally to FIGS. 1-8, various exemplary embodiments of an invention may now be described in detail. Where the various figures may describe embodiments sharing various common elements and features with other embodiments, similar elements and features are given the same reference numerals and redundant description thereof may be omitted below.

Various embodiments of a system as disclosed herein may include centralized computing nodes (e.g., a cloud server) in functional communication with a plurality of distributed data collectors and computing nodes (e.g., associated with individual users and/or vehicles) for effectively implementing wear models as disclosed herein.

Figure 1:
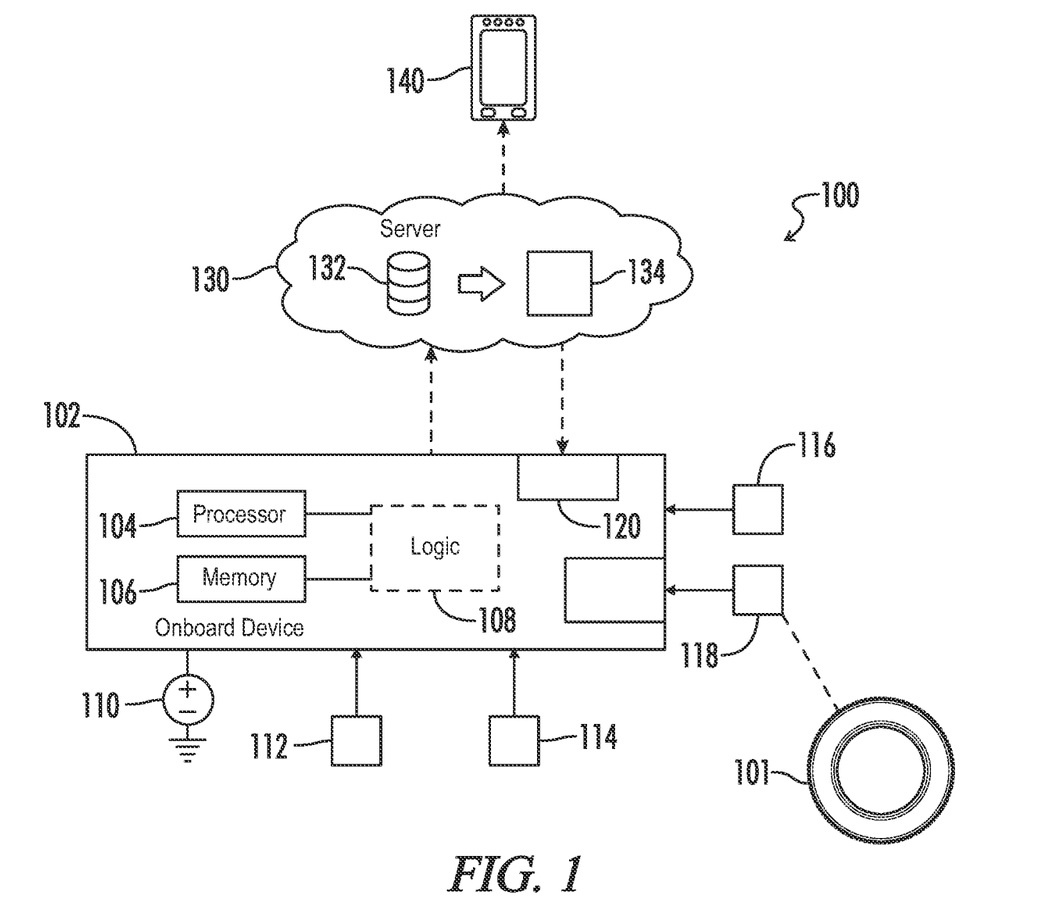
FIG. 1 is a block diagram representing an embodiment of a system for tread depth estimation as disclosed herein.

Referring initially to FIG. 1, an exemplary embodiment of the system 100 includes a computing device 102 that is onboard a vehicle and configured to at least obtain data and transmit said data to a remote server 130 and/or perform relevant computations as disclosed herein. The computing device may be portable or otherwise modular as part of a distributed vehicle data collection and control system (as shown), or otherwise may be integrally provided with respect to a central vehicle data collection control system (not shown). The device may include a processor 104 and memory 106 having program logic 108 residing thereon. The computing device 102 in various embodiments may be part of a vehicle electronic control unit (ECU) or otherwise may be discrete in nature, for example permanently or detachably provided with respect to a vehicle mount.

Generally stated, a system 100 as disclosed herein may implement numerous components distributed across one or more vehicles, for example but not necessarily associated with a fleet management entity, and further a central server 130 or server network in functional communication with each of the vehicles via a communications network. The vehicle components may typically include one or more sensors such as, e.g., vehicle body accelerometers, gyroscopes, inertial measurement units (IMU), position sensors such as global positioning system (GPS) transponders 112, tire pressure monitoring system (TPMS) sensor transmitters 118 and associated onboard receivers, or the like, as linked for example to a controller area network (CAN) bus network and providing signals thereby to local processing units. The illustrated embodiment includes for illustrative purposes, without otherwise limiting the scope of the present invention thereby, an ambient temperature sensor 116, a vehicle speed sensor 114 configured to collect for example acceleration data associated with the vehicle, and a DC power source 110. One or more of the sensors as disclosed herein may be integrated or otherwise collectively located in a given modular structure as opposed to being discrete and decentralized in structure. For example, a tire-mounted TPMS sensor as referred to herein may be configured to generate output signals corresponding to each of a plurality of tire-specific conditions (e.g., acceleration, pressure, temperature).

Various bus interfaces, protocols, and associated networks are well known in the art for the communication between the respective data source and the local computing device, and one of skill in the art would recognize a wide range of such tools and means for implementing the same.

It should be noted that the embodiment represented in FIG. 1 is not limiting on the scope of a system or method as disclosed herein, and that in alternative embodiments one or more of the models 134 may be implemented locally at the onboard computing device 102 rather than at the server level. For example, models 134 may be generated and trained over time at the server level, and downloaded to the onboard computing device 102 for local execution of one or more steps or operations as disclosed herein.

In other alternative embodiments, one or more of the various sensors 112, 114, 116, 118 may be configured to communicate directly with the remote server 130, or via a mobile computing device (not shown) carried by a user of the vehicle, rather than via the onboard computing device 102.

The system 100 may include additional distributed program logic such as for example residing on a fleet management server or other user computing device 140, or a user interface of a device resident to the vehicle or associated with a driver thereof (not shown) for real-time notifications (e.g., via a visual and/or audio indicator), with the fleet management device in some embodiments being functionally linked to the onboard device 102 via a communications network. System programming information may for example be provided on-board by the driver or from a fleet manager.

Vehicle and tire sensors 112, 114, 116, 118 may in an embodiment further be provided with unique identifiers, wherein the onboard device processor 104 can distinguish between signals provided from respective sensors on the same vehicle, and further in certain embodiments wherein a central server 130 and/or fleet maintenance supervisor client device 140 may distinguish between signals provided from tires 101 and associated vehicle and/or tire sensors across a plurality of vehicles. In other words, sensor output values may in various embodiments be associated with a particular tire 101, a particular vehicle, and/or a particular tire-vehicle system for the purposes of onboard or remote/downstream data storage and implementation for calculations as disclosed herein. The onboard device processor 104 may communicate directly with the hosted server 130 as shown in FIG. 1, or alternatively the driver's mobile device or truck-mounted computing device may be configured to receive and process/transmit onboard device output data to the hosted server 130 and/or fleet management server/device 140.

Signals received from a particular vehicle and/or tire sensor 112, 114, 116, 118 may be stored in onboard device memory 106, or an equivalent data storage network functionally linked to the onboard device processor 104, for selective retrieval as needed for calculations according to the method disclosed herein. A "data storage network" as used herein may refer generally to individual, centralized, or distributed logical and/or physical entities configured to store data and enable selective retrieval of data therefrom, and may include for example but without limitation a memory, look-up tables, files, registers, databases, and the like. In some embodiments, raw data signals from the various sensors 112, 114, 116, 118 may be communicated substantially in real time from the vehicle to the server 130. Alternatively, particularly in view of the inherent inefficiencies in continuous data transmission of high frequency data, the data may for example be compiled, encoded, and/or summarized for more efficient (e.g., periodic time-based or alternatively defined event-based) transmission from the vehicle to the remote server 130 via an appropriate communications network.

The vehicle data and/or tire data, once transmitted via a communications network to the hosted server 130, may be stored for example in a database 132 associated therewith. The server 130 may include or otherwise be associated with one or more algorithmic models 134 as disclosed herein for selectively retrieving and processing the vehicle data and/or tire data as appropriate inputs. The models 134 may be implemented at least in part via execution of a processor, enabling selective retrieval of the vehicle data and/or tire data and further in electronic communication for the input of any additional data or algorithms from a database, lookup table, or the like that is stored in association with the server 130.

The system 100 may include additional distributed program logic such as for example residing on a fleet management server or other user computing device 140, or a user interface of a device resident to the vehicle or associated with a driver thereof (not shown) for real-time notifications (e.g., via a visual and/or audio indicator), with the fleet management device 140 in some embodiments being functionally linked to the onboard device 102 via a communications network. System programming information may for example be provided on-board by the driver or from a fleet manager.

An example of a conventional tire pressure monitoring system (TPMS) sensor 118 includes a sensor transmitter functionally linked to a TPMS receiver, itself further linked to a data processing unit. The TPMS sensor transmitter may be provided in the interior air cavity of each tire 101 of a vehicle on either a tire wheel or an inner surface of the tire 101. The transmitter may detect an internal pressure and a contained air temperature 168 of the tire 101 at predetermined time intervals, and wirelessly transmits corresponding values along with a unique identifier associated with the tire 101 to the receiver. The transmitter may for example be mounted on a wheel rim 158 so as to be integral with a tire valve. Alternatively, the transmitter may be attached to an inner surface of the tire. The receiver further relays the signals from the transmitter to the data processing unit via a communication means such as for example Bluetooth.

The contained air temperature for a given tire may be described as a function of the vehicle speed, tire pressure, vertical load, tread depth, and ambient conditions such as air temperature. Typically, the load and tread depth may be unknown. In various embodiments as further disclosed herein, the tread depth may be estimated based on temperature measurements.

The pressure and temperature history of tires in operation is primarily driven by three factors: energy dissipation due to tire rolling and heat transfer to/from the tire to the environment; the heat capacity of the tire, which changes with the amount of thermal mass of the tire/wheel assembly; and the ambient temperature of the environment acting as a heat sink By interpreting the relationship between these factors, it is possible to devise algorithms that identify the current thermal mass of the tire/wheel assembly, which will change as tread rubber is removed due to tire wear. Accordingly, the present disclosure includes methods which utilize these relationships to infer the level of wear of tires by monitoring pressure changes over time and relating them to the thermal mass and hence the remaining rubber volume or wear level for the tire.

Exemplary techniques as disclosed herein and consistent with the present embodiment may focus on monitoring tire inflation pressure and/or temperature over time and using it together with supplemental information to judge wear levels. The logical flow of information may start with the collection of vehicle operational and environmental data, wherein these inputs are applied to a thermal model 134 of the tire, which estimates the thermal mass. The thermal mass of the tire may be further related to the remaining tread depth. Statistical processes and repeated measurements improve the algorithms and the corresponding tire wear predictions over time, for example through the use of machine learning techniques.

In the specific case of a vehicle that is stopped, and wherein the tires are cooling and the ambient temperature is known, the difference in cooling rate may be implemented for estimation of the tire thermal mass, further wherein the tire thermal mass may be implemented as an accurate indicator of remaining tire tread depth.

As another example, the tire inflation pressure and/or contained air temperature may be monitored over time while the vehicle is in operation (e.g., during a timespan corresponding to a single route), wherein the ambient temperature and route information such as vehicle speed, acceleration, and the like are known entities. The tire thermal mass may for example be estimated through calibration of a digital twin model 134 associated with the tire (as further discussed below), further based on historical data associated with the tire inflation pressure and/or temperature values, wherein as the tire starts to heat up faster relative to a prior reference, that would be an indication of reduced tire thermal mass and hence tire wear.

Figure 3:
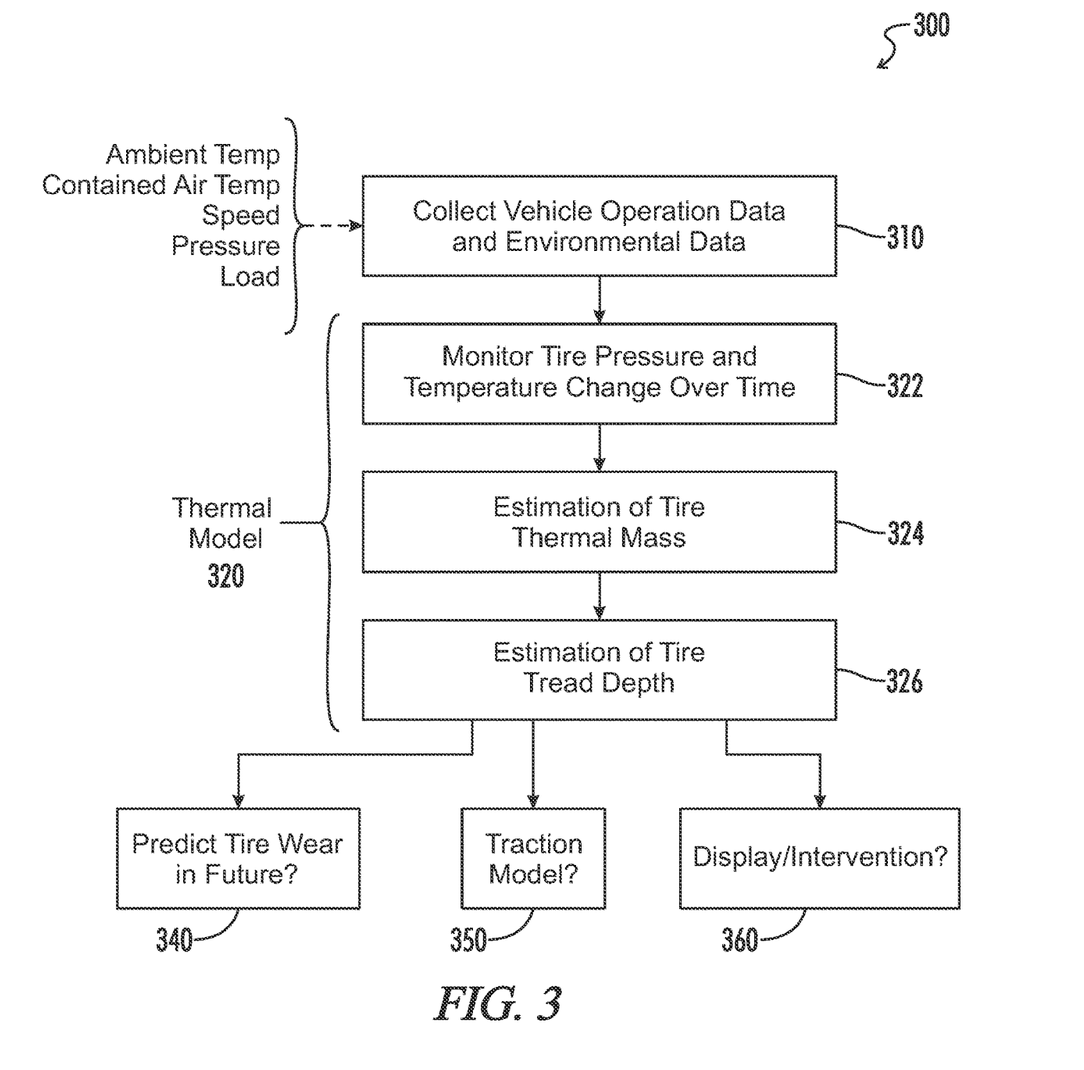
FIG. 3 is a flowchart representing an embodiment of a method for tread depth estimation as disclosed herein.

Generally stated, with illustrative reference to FIG. 3, exemplary embodiments of a method 300 as disclosed herein may include providing vehicle operational data and environmental data (step 310) as inputs to a thermal model (320), and detecting, for the at least first tire, tire condition data corresponding to an ambient temperature and a contained air temperature (step 322). The contained air temperature may in certain embodiments be measured directly, or as further described below may be estimated or otherwise indirectly determined in association with, e.g., appropriate heat transfer models or a directly measured tire inflation pressure. The method 300 further includes estimating a thermal mass of the at least first tire based at least in part on the detected operational data and the tire condition data (step 324), and estimating a current tread depth of the at least first tire based at least in part on the respective estimated thermal mass (step 326).

In one embodiment, the tire transient contained air temperature can be estimated by using a simple heat transfer model 134 that estimates the transient contained air temperature using a first order differential equation, e.g., of the form:

$$T(t) = (R_{ss}v/hA) + T\infty + (T_0 - (R_{ss}v/hA) - T\infty)e^{-t/\tau}$$

where: $T\infty$ is the ambient air temperature; $T_0$ is the initial temperature; $R_{ss}$ is the steady-state rolling resistance; $v$ is the vehicle speed, $h$ is a heat transfer coefficient, $A$ is the tire's surface area, and $\tau$ is the time constant. The steady-state rolling resistance depends on the tire inflation pressure, ambient air temperature, vehicle speed, vertical load, and tread depth, and the time constant depends on the mass of the tire.

If the load on the tire, the vehicle speed, tire inflation pressure and the ambient air temperature are known, the tread depth and the mass (which relates to tread depth) can be isolated as the only unknown variables. By implementing, e.g., a Kalman filter, the estimation can be improved upon by considering measurement and prediction uncertainties.

As noted above, this embodiment requires that the load on the tire is known. However, one practical issue with determining the tread depth on the tire from temperature measurements is that the load is typically unknown.

In another embodiment, this issue may be circumvented by only considering data collected when the tire is cooling down after running for a period of time, and using a simple heat transfer model 134 of the tire. For example, a heat energy balance of the system leads to the equation $$\dot{Q}_{gen} - \dot{Q}_{surr} = \dot{Q}_{stored} \quad [1]$$

where $\dot{Q}_{gen}$ is the rate of heat transfer generated by the tire, $\dot{Q}_{surr}$ is the rate of heat transfer to the surroundings, and $\dot{Q}_{stored}$ is the rate of heat transfer stored in the tire.

By assuming that all rolling resistance is converted to heat, and only considering convection for the heat transfer to the surroundings, Equation 1 may be expressed as:

$$RV - hA(T - T\infty) = mc_p \dot{T} \quad [2]$$

where R is the transient rolling resistance force, V is the velocity of the tire, h is the heat transfer coefficient, A is the surface area, T is the temperature, $T_\infty$ is the ambient temperature, m is the mass of the tire and $c_p$ is the heat capacity of the tire.

The transient rolling resistance can be estimated to be linearly dependent on the instantaneous temperature:

$$R = R_{ss}[1 + \alpha(T - T_{ss})] \quad [3]$$

where $R_{ss}$ is the steady-state rolling resistance, $T_{ss}$ is the steady-state temperature, and a is a constant.

Substituting Equation 3 into Equation 2 results in:

$$\dot{T} + \frac{\alpha R_{ss} V + hA}{mc_p} T = \frac{R_{ss} V(1 + \alpha T_{ss})}{mc_p} + \frac{hA}{mc_p} T_\infty \quad [4]$$

This linear first order differential equation can be solved analytically. For example, the constant in front of the T term may be characterized as $a_1$ and the constant term on the right side of the equation may be characterized as $a_2$. The solution to the differential equation is then:

$$T(t) = \frac{a_2}{a_1} + c_1 e^{-a_1 t} \quad [5]$$

where $c_1$ is a constant of integration.

The solution for $c_1$ can be found from the boundary condition of $T(0) = T_0$, so that $$c_1 = T_0 - \frac{a_2}{a_1} \quad [6]$$

Also, as can be seen from Equation 5, the steady-state temperature is equal to $a_2/a_1$, which can be simplified to:

$$T_{ss} = \frac{a_2}{a_1} = \frac{R_{ss} V}{hA} + T_\infty \quad [7]$$

Referring again to Equation 5, the time constant is equal to $1/a_1$, which yields:

$$\tau = \frac{1}{a_1} = \frac{mc_p}{\alpha R_{ss} V + hA} \quad [8]$$

Equation 8 suggests that the thermal time constant for normal operation is complex due to it being a function of the rolling resistance. This is because the rolling resistance will vary depending on load, pressure, speed, and temperature.

Figure 4:
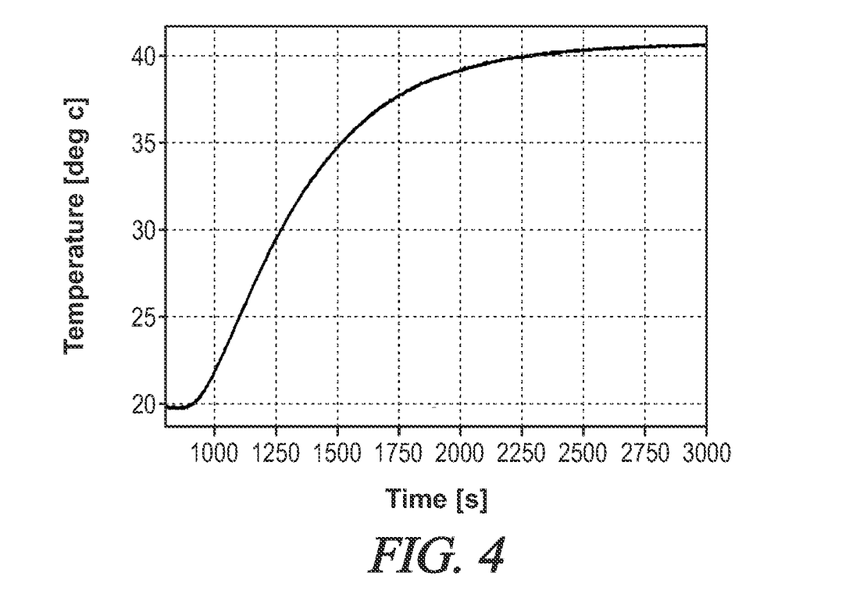
FIG. 4 is a graphical diagram representing an exemplary contained air temperature profile for a tire under constant driving conditions.

FIG. 4 illustrates a typical temperature profile for a tire under constant driving conditions. By focusing on the cool down of the tire (i.e., when the tire is at a standstill) rather than the heat up, the thermal time constant is only a function of the tire mass:

$$\tau = \frac{mc_p}{hA} \quad [9]$$

This relationship is arguably much simpler because it strips away the complexities tied up in the rolling resistance value that is involved in the thermal time constant during operation. Briefly stated, the less mass a tire has, the faster it will cool down. It may be assumed that mass loss during a tire's life may substantially be due to tread loss, and thus by determining the change in mass of a tire using Equation 9 the change in tread depth can also be inferred.

By measuring the contained air temperature of the tire for a duration after it comes to a standstill after being in operation, the thermal time constant can be estimated. Then by using for example Equation 9 the mass of the tire, and subsequently the tread depth of the tire can be estimated. In such an embodiment as disclosed herein, it is possible that only the contained air temperature and ambient temperature are required for measurement. Accordingly, conventional tire-mounted sensors (e.g., TPMS) can be used to gather some or all of the necessary data.

In order to further estimate the tread depth from contained air temperature and ambient temperature measurements according to an embodiment of the method 300 as noted above, additional parameters may be further determined. For example, when the tire at issue is first installed and known to be new, an associated thermal time constant can be estimated from temperature data and the heat transfer properties in Equation 9 can be determined by:

$$\frac{c_p}{hA} = \frac{\tau}{m} \quad [10]$$

where it is being assumed that since the tire is new the mass is known or provided by the tire manufacturer.

Then, as the tire wears, the mass at a given point in time may be determined by using Equation 9 with the result from Equation 10. In an embodiment, the thermal time constant may be estimated by finding the time constant that best fits the cool down data using a first order differential equation of the form, e.g.:

$$T(t) = T_\infty + (T_0 - T_\infty) e^{-t/\tau} \quad [11]$$

Wherein: $T_\infty$ is the ambient air temperature; $T_0$ is the initial temperature; and $\tau$ is the time constant. The time constant varies linearly with the mass of the tire. As the tire wears, the mass decreases and hence the time constant also decreases. Otherwise stated, the tire heats up and cools down faster in accordance with increased wear on the tire. By measuring the time constant when the tire is new, the change in mass (and thus the change in tread depth) can be estimated. The mass loss may be converted to tread loss using for example the geometric relationship:

$$\Delta h = \frac{\Delta m}{2\pi R w \rho} \quad [12]$$

where R is the outer radius of the tire, w is the tread width, p is the tread rubber density, and $\Delta h$ is the tread loss. The tread density may for example be chosen as a generic 1100 $kg/m^3$.

In order to get an accurate measurement of the time constant, the cool down period measurement duration must be sufficient. This will vary based on the type of tire and the amount of remaining tread, but it will typically be on the order of minutes.

Experimental data were collected in accordance with the above-referenced technique from two tires—a Bridgestone Turanza EL440 and a Destination A/T. The tires were tested on a drum, buffed, and then retested several times. The results of the time constant calculated from the temperature measurements are reproduced below:

| Tire Desc. | New | 2 mm Worn | 4 mm Worn | 6 mm Worn |
| --- | --- | --- | --- | --- |
| EL440 | 3972 s | 3294 s | 3182 s | 2730 s |
| Dest. A/T | 7413 s | 5884 s | 5420 s | 4302 s |

A drum test was conducted to assess the accuracy of tire tread depth estimates in accordance with the above-referenced embodiments. The Bridgestone Turanza EL440 tire was tested on drum at a single condition (5000 N, 230 kPa, 100 kph) for thirty minutes, which was long enough for the tire to reach a steady-state temperature. The drum was then stopped, and data was collected for another two hours (enough time for the tire to cool down to the ambient temperature in the test chamber). The tire tread was then buffed to a lower tread depth, and then a small wait period for the tire to fully cool down from the buffing process before going back on the drum. The same test was then conducted, and this was repeated for several different tread depths. The tread depths studied were 7.5 mm, 6.0 mm, 4.5 mm, and 2 mm. These tread depths were averages across the main grooves of the tire and in three different locations around the circumference. A device was attached to the inner liner of the tire in the center of the crown region which measured temperature. The ambient temperature of the test chamber was also collected.

Figure 5:
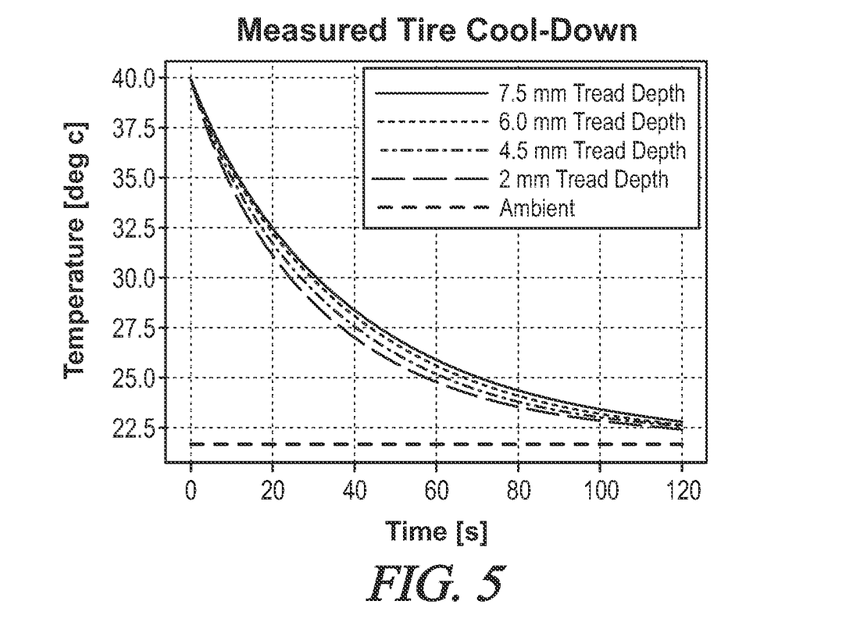
FIG. 5 is a graphical diagram representing a measured tire cool-down over time and at different tread depths in association with a drum test.

FIG. 5 shows the results of this test. As can be seen in the plot, the expected relationship between tread depth and cool-down temperature profile is evident in these experimental results. As the tread depth decreases, the tire cools off faster and has a smaller thermal time constant.

Figure 6:
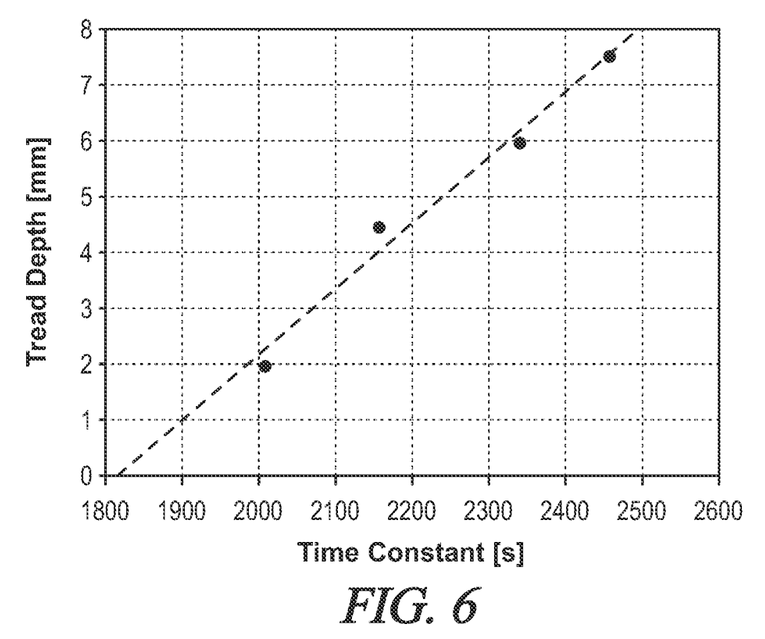
FIG. 6 is a graphical diagram representing an exemplary correlation between tread depth and thermal time constant.

FIG. 6 further demonstrates the strong correlation between tread depth and the thermal time constant. This strong correlation on its own may in certain embodiments substantially embody a model for estimating tread depth, but this may undesirably require pre-testing for every new tire design.

Figure 7:
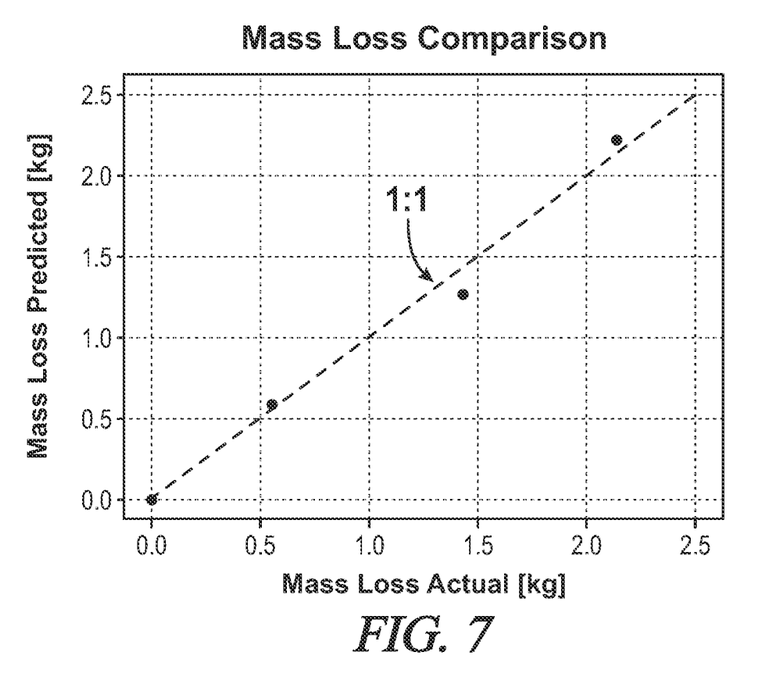
FIG. 7 is a graphical diagram representing exemplary results of using a relationship between tire mass and thermal time constant to estimate the mass loss for each test result.

FIG. 7 shows the results of using a relationship between tire mass and thermal time constant to estimate the mass loss for each test result, potentially obviating the need to do pre-testing. These results fall on a nearly one-to-one line when compared to the actual mass loss measured for each tread depth.

Figure 8:
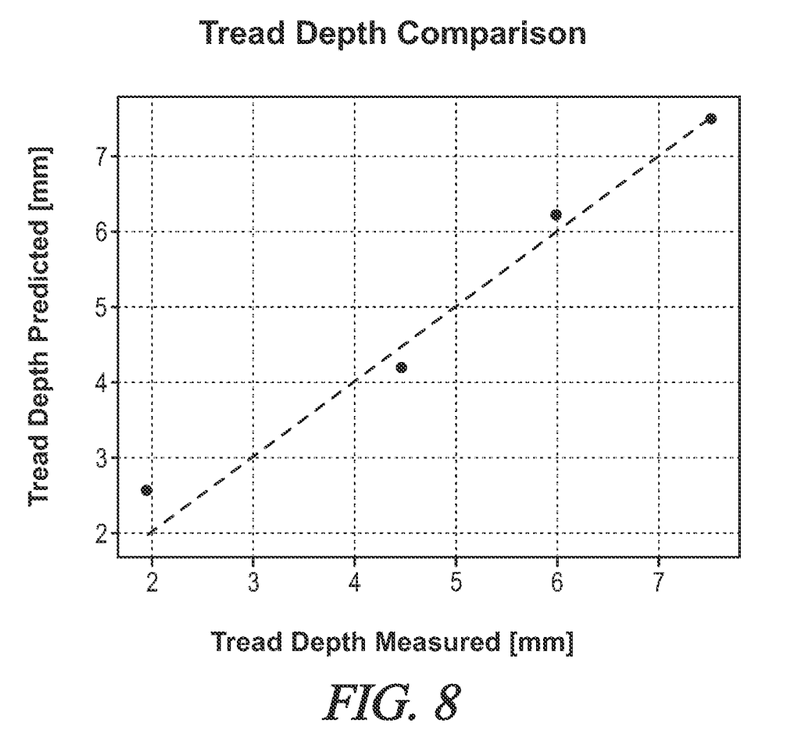
FIG. 8 is a graphical diagram representing a comparison of tread depth predicted in accordance with a method of the present disclosure with respect to a measured actual tread depth of the tire.

FIG. 8 shows the results of using an exemplary model as disclosed herein to estimate the tread depth based on the data shown in FIG. 5. Both FIG. 7 and FIG. 8 demonstrate reasonable accuracy, but FIG. 8 has slightly lower accuracy in the lowest tread depth data point (i.e., the lower left-hand point in FIG. 8 which corresponds to the upper right-hand point in FIG. 7). For this point, the mass loss predicted is very close to the actual mass loss, however the predicted tread depth is off by about 0.5 mm. This suggests that by using more precise geometry of the tread pattern, the tread depth result would be much more accurate. Even with the simpler geometry that is assumed, the error is less than five percent on average, with a maximum of about 0.5 mm. These results would be more than acceptable for the majority of applications.

In an embodiment as disclosed herein, rather than directly measuring contained air temperature, the contained air temperature may be calculated based on the tire inflation pressure. The tire inflation pressure is related to the contained air temperature by the ideal gas law:

$$pV = NRT$$

wherein: p is the tire inflation pressure; V is the volume of the air cavity; N is the number of moles; R is the ideal gas constant; and T is the contained air temperature. Based on the ideal gas law there is a linear relationship between the pressure and temperature, if it is assumed that the volume and the number of moles remain constant, which is a good assumption when there is negligible air leakage and no volume change.

This embodiment may provide value over embodiments requiring direct measurements of the contained air temperature because it makes it possible to use a pressure sensor as an indicator of contained air pressure, which could be mounted internally or externally to the cavity. Unlike internally mounted sensors, which sense both the pressure and internal temperature, externally mounted sensors are exposed to the external temperature and therefore unable to measure the contained air temperature directly. The externally mounted sensors do, however, measure the cavity pressure. External tire pressure monitoring system (TPMS) devices may be preferred for their simplicity, at least because for example they are easily installed and accessible without having to dismount the tire.

Figure 2:
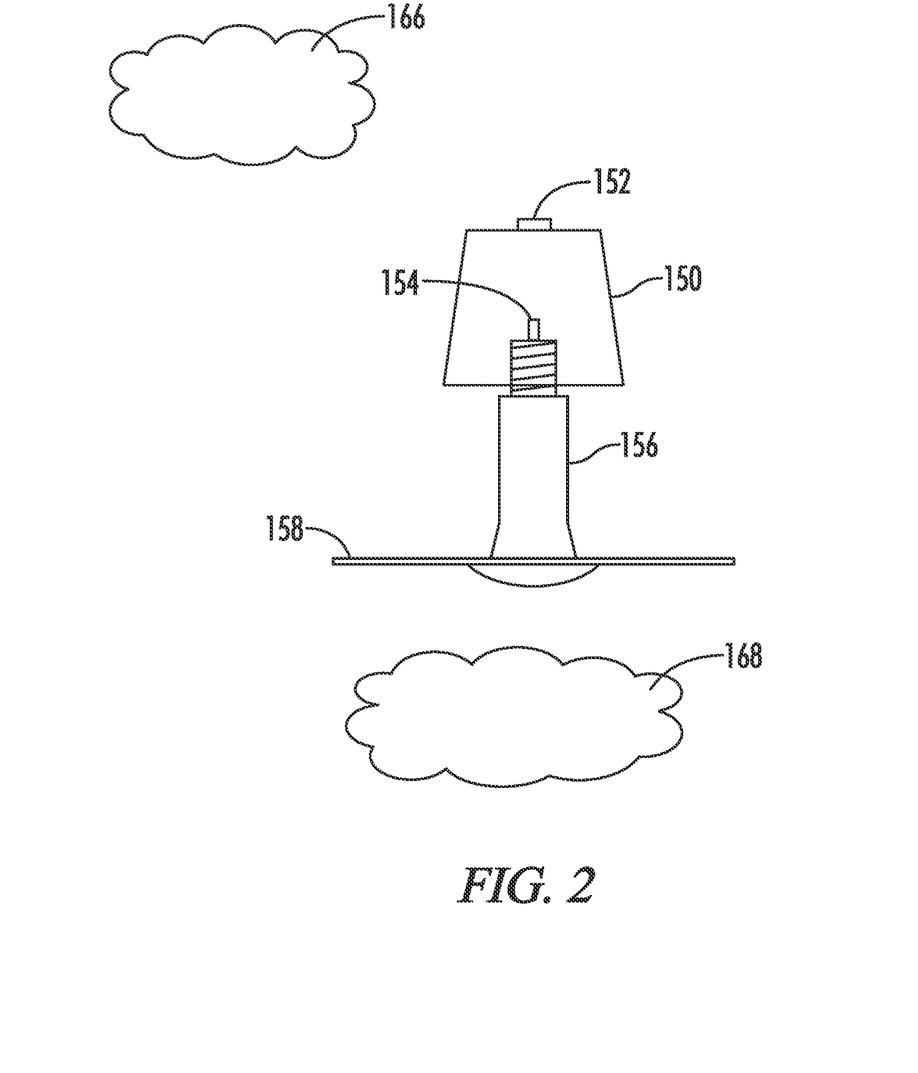
FIG. 2 is a perspective view of an exemplary sensor for detecting tire pressure and ambient temperature according to the system of FIG. 1.

Referring next to FIG. 2, in an embodiment as discussed above the internally mounted tire pressure monitoring system (TPMS) sensor 118 as represented in FIG. 1 may accordingly be replaced with an externally mounted cap-type sensor 150, which in the example shown screws onto the valve stem 156 extending from the tire rim 158. Other sensors that are connected via hoses or embedded into the valve stem are also considered as within the scope of the present disclosure. The two main components of the sensor 150 are a temperature sensor 152 that is configured to measure the temperature of the outside ambient air 166, and a pressure sensor 154 that is configured to measure the contained air pressure 168.

With an external pressure sensor 154 and temperature sensor 152, as for example mounted on the valve stem 156, it is possible to measure the ambient temperature 166 just outside of the tire in addition to the tire pressure. This may beneficially provide a more accurate ambient temperature measurement than would otherwise be the case if the ambient is measured by a receiver on the vehicle's undercarriage. In addition, the receiver can now be removed from the undercarriage and placed anywhere (e.g., inside the cabin) for simpler installation and versatility of use.

Various embodiments as disclosed herein may be based at least in part on the relationship of pressure and temperature in a contained volume with negligible air leakage. One of skill in the art may appreciate that this is true for tire wheel assemblies that only have air loss over days and weeks due to diffusion of air through the tire; air loss over time scales that are of the order of hours is essentially negligible.

In various embodiments, the method 300 may further involve providing the tread depth estimations as inputs to a model 134 for predicting wear values at one or more future points in time (step 340), wherein such predicted values may be compared to respective threshold values. For example, a feedback signal corresponding to the predicted tire wear status (e.g., predicted tread depth at a given distance, time, or the like) may be provided via an interface to an onboard device 102 associated with the vehicle itself, or to a mobile device associated with a user, such as for example integrating with a user interface configured to provide alerts or notice/recommendations that a tire should or soon will need to be replaced. Other tire-related threshold events can be predicted and implemented for alerts and/or interventions within the scope of the present disclosure and based on predicted tire wear, including for example tire rotation, alignment, inflation, and the like. The system 100 may generate such alerts and/or intervention recommendations based on individual thresholds, groups of thresholds, and/or non-threshold algorithmic comparisons with respect to predetermined parameters.

Various tire wear values may be estimated based on, e.g., "digital twin" virtual representations of various physical parts, processes or systems wherein digital and physical data is paired and combined with learning systems such as for example neural networks. For example, real data from a vehicle and associated location/route information may be provided to generate a digital representation of the vehicle tire for estimation of tire wear, wherein subsequent comparison of the estimated tire wear with a determined actual tire wear may be implemented as feedback for the machine learning algorithms. The wear model 134 may be implemented at the vehicle, for processing via the onboard system, or the tire data and/or vehicle data may be processed to provide representative data to the hosted server for remote wear estimation.

The tire wear status (e.g., tread depth) may for example be provided along with certain vehicle data as inputs to a traction model (step 350), which may be configured to provide an estimated traction status or one or more traction characteristics for the respective tire. As with the aforementioned wear model, the traction model may comprise "digital twin" virtual representations of physical parts, processes or systems wherein digital and physical data are paired and combined with learning systems such as for example artificial neural networks. Real vehicle data and/or tire data from a particular tire, vehicle or tire-vehicle system may be provided throughout the life cycle of the respective asset to generate a virtual representation of the vehicle tire for estimation of tire traction, wherein subsequent comparison of the estimated tire traction with a corresponding measured or determined actual tire traction may preferably be implemented as feedback for machine learning algorithms executed at the server level.

The traction model may in various embodiments utilize the results from prior testing, including for example stopping distance testing results, tire traction testing results, etc., as collected with respect to numerous tire-vehicle systems and associated combinations of values for input parameters (e.g., tire tread, inflation pressure, road surface characteristics, vehicle speed and acceleration, slip rate and angle, normal force, braking pressure and load), wherein a tire traction output may be effectively predicted for a given set of current vehicle data and tire data inputs.

In one embodiment, outputs from this traction model may be incorporated into an active safety system. The term "active safety systems" as used herein may preferably encompass such systems as are generally known to one of skill in the art, including but not limited to examples such as collision avoidance systems, advanced driver-assistance systems (ADAS), anti-lock braking systems (ABS), etc., which can be configured to utilize the traction model output information to achieve optimal performance. For example, collision avoidance systems are typically configured to take evasive action, such as automatically engaging the brakes of a host vehicle to avoid or mitigate a potential collision with a target vehicle, and enhanced information regarding the traction capabilities of the tires and accordingly the braking capabilities of the tire-vehicle system are eminently desirable.

In another embodiment, a ride-sharing autonomous fleet could use output data from the traction model to disable or otherwise selectively remove vehicles with low tread depth from use during inclement weather, or potentially to limit their maximum speeds.

In various embodiments, the method may further involve comparing a current wear value with respect to a threshold value to determine whether (or when) the tire requires intervention such as for example replacement (step 360). The method may alternatively or further include predicting wear values at one or more future points in time, wherein such predicted values may be compared to respective threshold values. As represented for example in FIG. 1, a feedback signal corresponding to the predicted tire wear status (e.g., predicted tread depth at a given distance, time, or the like) may be provided via an interface 120 to an onboard device 102 associated with the vehicle itself, or to a mobile device 140 associated with a user, such as for example integrating with a user interface configured to provide alerts or notice/recommendations that a tire should or soon will need to be replaced.

As another example, an autonomous vehicle fleet may comprise numerous vehicles having varying minimum tread status values, wherein the fleet management system may be configured to disable deployment of vehicles falling below a minimum threshold. The fleet management system may further implement varying minimum tread status values corresponding to wheel positions. The system may accordingly be configured to act upon a minimum tire tread value for each of a plurality of tires associated with a vehicle, or in an embodiment may calculate an aggregated tread status for the plurality of tires for comparison against a minimum threshold.

In various embodiments the method may further include data streaming even where threshold violations are not detected, wherein estimated and/or predicted wear values can be displayed in real-time on the local user interface and/or a remote display (e.g., associated with the fleet management server), and further displayed data may include, e.g., the contained air temperature.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Whereas certain preferred embodiments of the present invention may typically be described herein with respect to tire wear estimation for fleet management systems and more particularly for autonomous vehicle fleets or commercial trucking applications, the invention is in no way expressly limited thereto and the term "vehicle" as used herein unless otherwise stated may refer to an automobile, truck, or any equivalent thereof, whether self-propelled or otherwise, as may include one or more tires and therefore require accurate estimation or prediction of tire wear and potential disabling, replacement, or intervention in the form of for example direct vehicle control adjustments.

The term "user" as used herein unless otherwise stated may refer to a driver, passenger, mechanic, technician, fleet management personnel, or any other person or entity as may be, e.g., associated with a device having a user interface for providing features and steps as disclosed herein.

The previous detailed description has been provided for the purposes of illustration and description. Thus, although there have been described particular embodiments of a new and useful invention, it is not intended that such references be construed as limitations upon the scope of this invention except as set forth in the following claims.

The invention claimed is:

1. A computer-implemented method for estimating tread depth remaining on a tire mounted on a vehicle, the method comprising:

detecting operational data associated with the vehicle and/or the tire;

detecting tire condition data corresponding to at least an ambient temperature and a contained air temperature;

estimating a thermal mass of the tire based on at least detected changes in the detected operational data and detected changes in the tire condition data over time; and estimating a current tread depth of the tire based on at least the respective estimated thermal mass.

2. The computer-implemented method according to claim 1, wherein:
the contained air temperature is measured directly via a tire-mounted sensor.

3. The computer-implemented method according to claim 1, wherein:
the contained air temperature is derived in association with a directly measured tire inflation pressure.

4. The computer-implemented method according to claim 3, wherein:
the tire condition data is detected via one or more sensors mounted to an exterior of the at least first tire.

5. The computer-implemented method according to claim 1, further comprising, with the vehicle stopped:
determining changes over time in a time constant associated with the tire during a cooling period, and
estimating a change in thermal mass of the tire based on at least the determined changes over time in the time constant.

6. The computer-implemented method according to claim 1, wherein the method further comprises, with the vehicle stopped:
monitoring the tire pressure and/or the contained air temperature during a cooling period;
determining a cooling rate of the monitored tire pressure and/or contained air temperature during the cooling period; and
estimating the thermal mass of the tire based on at least the determined cooling rate of the monitored tire pressure and/or contained air temperature.

7. The computer-implemented method according to claim 1, wherein:
with the vehicle in movement, the detected operational data associated with the vehicle further comprises a vehicle speed and a load; and
the method further comprises determining a time constant dependent with respect to the thermal mass of the tire.

8. The computer-implemented method according to claim 1, wherein:
with the vehicle in movement, the detected operational data associated with the vehicle further comprises a vehicle speed; and
the estimated thermal mass of the tire is calibrated based on aggregated models of thermal mass with respect to historical data for tire pressure and/or contained air temperature.

9. The computer-implemented method according to claim 1, further comprising:
implementing the estimated tread depth as an input to a tire wear prediction model.

10. The computer-implemented method according to claim 9, further comprising:
predicting a replacement time for the at least first tire, based on a predicted tire wear status, as compared with one or more tire wear thresholds associated with the tire.

11. The computer-implemented method according to claim 10, wherein:
the one or more tire wear thresholds comprise a tire tread threshold corresponding to a given wheel position for the vehicle-tire combination.

12. The computer-implemented method according to claim 10, further comprising:
generating a vehicle maintenance alert comprising the predicted replacement time and an identifier associated with the vehicle-tire combination; and
transmitting a message comprising the vehicle maintenance alert to a fleet management device.

13. A system for estimating tread depth remaining on at least a first tire mounted on a vehicle, the system comprising:
one or more sensors configured to detect operational data associated with the vehicle and tire condition data corresponding to at least an ambient temperature and a contained air temperature; and
a computing device functionally linked to the one or more sensors and to a selectable algorithmic thermal model, and configured to:
estimate a thermal mass of the tire based on at least detected changes in the detected operational data and detected changes in the tire condition data over time; and
estimate a current tread depth of the tire based on at least the respective estimated thermal mass.

14. The system according to claim 13, wherein:
at least one of the one or more sensors is a tire pressure monitoring system (TPMS) sensor mounted to an exterior of the tire.

15. The system according to claim 13, wherein the computing device is remote with respect to the vehicle and functionally linked to the one or more sensors via a communications network and at least a second computing device residing within the vehicle.

16. The system according to claim 13, wherein the computing device is further configured to, with the vehicle stopped:
determine changes over time in a time constant associated with the tire during a cooling period, and
estimate a change in thermal mass of the tire based on at least the determined changes over time in the time constant.

17. The system according to claim 13, wherein the computing device is further configured to, with the vehicle stopped:
monitor the tire pressure and/or the contained air temperature during a cooling period;
determine a cooling rate of the monitored tire pressure and/or contained air temperature during the cooling period; and
estimate the thermal mass of the tire based on at least the determined cooling rate of the monitored tire pressure and/or contained air temperature.

18. The system according to claim 13, wherein:
with the vehicle in movement, the detected operational data associated with the vehicle further comprises a vehicle speed and a load; and
the computing device is configured to determine a time constant dependent with respect to the thermal mass of the tire.

19. The system according to claim 13, wherein:
with the vehicle in movement, the detected operational data associated with the vehicle further comprises a vehicle speed; and the estimated thermal mass of the tire is calibrated based on aggregated models of thermal mass with respect to historical data for tire pressure and/or contained air temperature.

20. The system according to claim 13, wherein the computing device is configured to:
implement the estimated tread depth as an input to a tire wear prediction model; and
predict a replacement time for the at least first tire, based on a predicted tire wear status, as compared with one or more tire wear thresholds associated with the tire;
wherein the one or more tire wear thresholds comprise a tire tread threshold corresponding to a given wheel position for the vehicle-tire combination.

* * * * *